US012754584B2

(12) United States Patent
Carton et al.

(10) Patent No.: US 12,754,584 B2
(45) Date of Patent: Oct. 6, 2026

(54) PUSH BUTTON

(71) Applicant: CROUZET, Valence (FR)

(72) Inventors: Hervé Carton, Valence (FR); Damien Beurdeley, Valence (FR)

(73) Assignee: CROUZET, Valence (FR)

( * ) Notice: Subject to any disclaimer, the term of this patent is extended or adjusted under 35 U.S.C. 154(b) by 54 days.

(21) Appl. No.: 18/858,324

(22) PCT Filed: Apr. 18, 2023

(86) PCT No.: PCT/EP2023/059989
§ 371 (c)(1),
(2) Date: Oct. 20, 2024

(87) PCT Pub. No.: WO2023/203017
PCT Pub. Date: Oct. 26, 2023

(65) Prior Publication Data

US 2026/0186522 A1 Jul. 2, 2026

(30) Foreign Application Priority Data

Apr. 20, 2022 (FR) ........................................ 2203637

(51) Int. Cl.
*G05G 1/02* (2006.01)
*G05G 5/03* (2008.04)
(Continued)

(52) U.S. Cl.
CPC ............... *G05G 1/02* (2013.01); *G05G 1/025* (2013.01); *G05G 5/03* (2013.01); *G05G 5/04* (2013.01);
(Continued)

(58) Field of Classification Search
CPC ............ G05G 1/02; G05G 1/025; G05G 5/03; G05G 5/04; G05G 5/05; G05G 2505/00; G05G 2700/08; H01H 13/14; H01H 13/26
See application file for complete search history.

(56) References Cited

U.S. PATENT DOCUMENTS 4,251,703 A * 2/1981 Hoeft ........................ H01H 3/12
200/341
4,933,521 A * 6/1990 Steward, Sr. .......... H01H 13/20
200/500

FOREIGN PATENT DOCUMENTS

DE 1834595 U 7/1961
DE 1187094 B 2/1965
(Continued)

OTHER PUBLICATIONS

International Search Report for International Application No. PCT/EP2023/059989, mailed Jul. 24, 2023, 5 pages with English translation.

(Continued)

*Primary Examiner* — Prasad V Gokhale
(74) *Attorney, Agent, or Firm* — TraskBritt

(57) ABSTRACT

A push button includes a pusher equipped with two facing slots. A bayonet coupling of the pusher includes a bar that passes through the two slots of the pusher. The ends of the bar project beyond the pusher, and each of the ends bears against an upper face of a collar of a fixed body of the button. The bar is capable of sliding inside the two slots when the pusher is moved between a rest position and a depressed position. A spring is entirely accommodated inside the pusher. A bayonet, of the bayonet coupling, and one from among the bar and a lower stop of the pusher may form a single, same component.

8 Claims, 4 Drawing Sheets

(51) Int. Cl.
*G05G 5/04* (2006.01)
*G05G 5/05* (2006.01)
*H01H 13/14* (2006.01)

(52) U.S. Cl.
CPC ........... *G05G 5/05* (2013.01); *G05G 2505/00* (2013.01); *H01H 13/14* (2013.01)

(56) References Cited

FOREIGN PATENT DOCUMENTS

| | | | | | |
|---|---|---|---|---|---|
| FR | 2135278 | A1 | | 12/1972 | |
| FR | 2746133 | A1 | | 9/1997 | |
| FR | 3007156 | A1 | | 12/2014 | |
| FR | 3078174 | B1 | | 2/2020 | |
| GB | 472924 | A | | 10/1937 | |
| GB | 544987 | A | | 5/1942 | |
| JP | 2020149905 | A | * | 9/2020 | ............... H01H 3/20 |

OTHER PUBLICATIONS

International Written Opinion for International Application No. PCT/EP2023/059989, mailed Jul. 24, 2023, 8 pages with English machine translation.

* cited by examiner

PUSH BUTTON

CROSS-REFERENCE TO RELATED APPLICATIONS

This application is a national phase entry under 35 U.S.C. § 371 of International Patent Application PCT/EP2023/059989, filed Apr. 18, 2023, designating the United States of America and published as International Patent Publication WO 2023/203017 A1 on Oct. 26, 2023, which claims the benefit, under Article 8 of the Patent Cooperation Treaty, of French Patent Application Serial No. FR2203637, filed Apr. 20, 2022.

TECHNICAL FIELD

The disclosure relates to a push button.

BACKGROUND

Conventionally, a push button comprises:

a fixed body, and a pusher that can slide inside the fixed body between a rest position and a depressed position.

To make it easier to assemble the pusher inside the fixed body, it has already been proposed to use a bayonet coupling for this. For example, such a push button that can be assembled more simply by the use of a bayonet coupling is disclosed in the application DE1834595.

However, the push button in the application DE1834595 has several drawbacks, including notably the fact that the spring used to produce the bayonet coupling must be accommodated outside of the pusher. It is then necessary to provide additional parts that protect this spring against attacks from the external environment. These additional parts make the architecture and the production of this push button more complex.

Prior art regarding bayonet couplings used in push buttons is also disclosed in the following applications: GB472924A, DE1187094B and U.S. Pat. No. 4,251,703A.

BRIEF SUMMARY

An aim of the disclosure is to realize a push button that can be assembled more simply by the use of a bayonet coupling while still remaining simple to produce.

A subject of the disclosure is therefore a push button according to claim 1.

BRIEF DESCRIPTION OF THE DRAWINGS

The disclosure will be better understood on reading the following description, which is given solely by way of nonlimiting example and with reference to the drawings, in which.

In these figures, the same references are used to designate the same elements. In the rest of this disclosure, the features and functions well known to those skilled in the art are not described in detail.

DETAILED DESCRIPTION

In this disclosure, detailed examples of embodiments are first of all described in chapter I with reference to the figures. Then, in chapter II, variants of these embodiments are introduced. Lastly, the advantages of the various embodiments are presented in chapter III.

Chapter I: Examples of Embodiments

Figure 1:
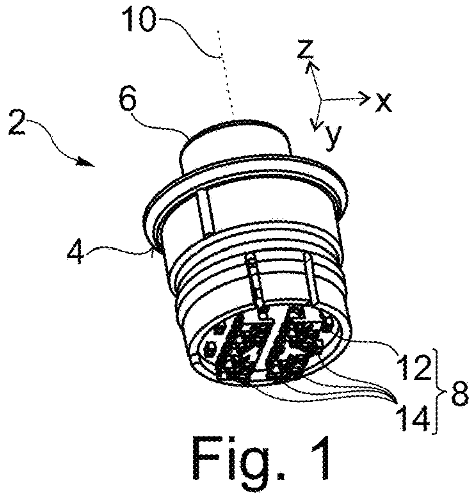
FIG. 1 is a schematic illustration, in perspective, of a push button in an assembled state.

FIG. 1 shows a push button 2 in an assembled state. This button is typically intended to be used as a man-machine interface. For example, such a button 2 is incorporated in a dashboard of an aircraft or on a control stick of an aircraft.

In FIG. 1 and the subsequent figures, an orthogonal coordinate system XYZ is used to indicate the orientation of the button in space. The direction Z is vertical and points from bottom to top. The directions X and Y are horizontal directions. In this text, terms such as "top," "bottom," "upper," "lower," "above," and "below" are defined relative to the direction Z.

Figure 3:
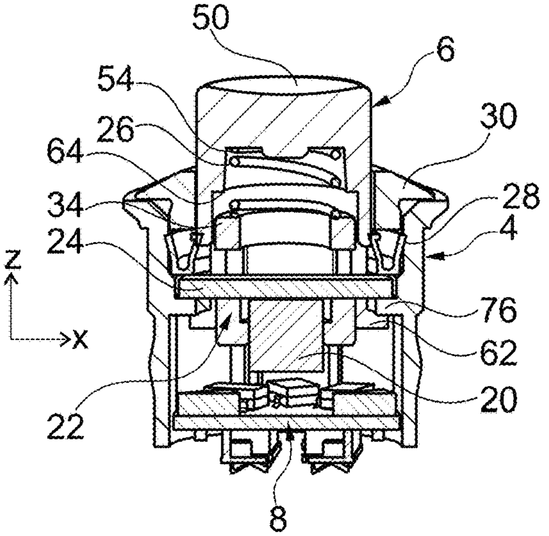
FIGS. 3 and 4 are schematic illustrations, in vertical section, of the push button in FIG. 1 in a rest position and in a depressed position, respectively.
Figure 4:
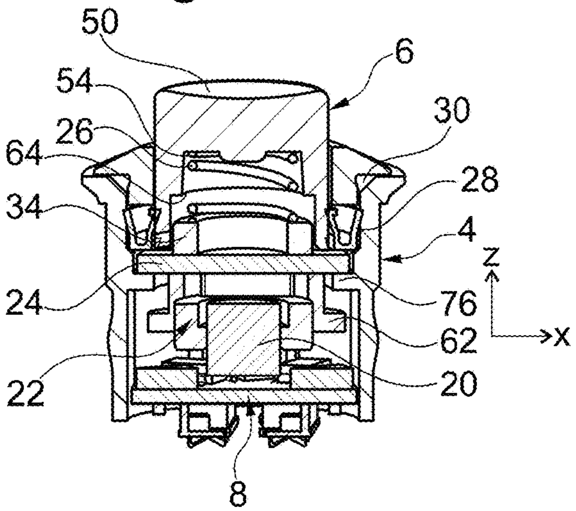

The button 2 comprises:

a fixed body 4 intended to be mounted, without any degree of freedom, in the dashboard or the control stick, a pusher 6 that can be moved between a rest position, shown in FIGS. 1 and 3, and a depressed position, shown in FIG. 4, and an electronic circuit 8 capable of detecting the position of the pusher 6 and transmitting this information to an electronic processing unit that, in response, triggers a command for an electric actuator on the basis of the detected position of the pusher 6.

In this case, the body 4 is a tubular body inside which all of the elements of the button 2 are accommodated. Here, the cross section of the body 4 is substantially circular.

The pusher 6 moves reversibly between its rest position and its depressed position by sliding inside the body 4 along a vertical movement axis 10. The rest position is the position occupied by the pusher 6 when no external pressure is being applied. The rest position is therefore a stable position. The upper end of the pusher 6 is pressed into the body 4 to a lesser extent in the rest position than in the depressed position. For example, in the rest position, the upper end of the pusher 6 protrudes above the body 4.

Figure 2:
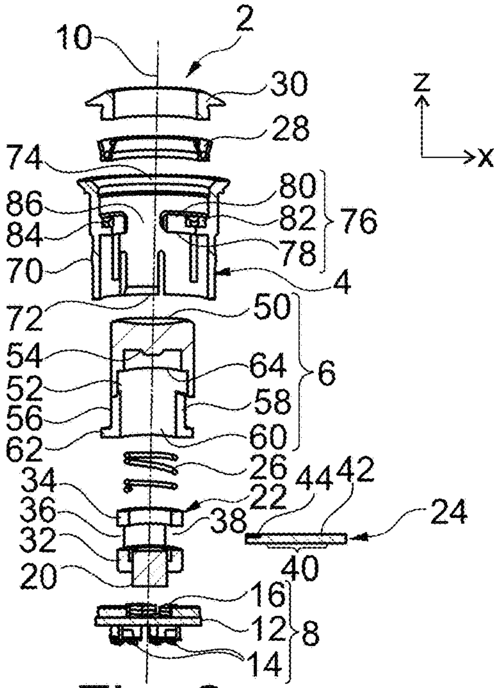
FIG. 2 is a schematic illustration, in vertical section, of the push button in FIG. 1 in a disassembled state.

The electronic circuit 8 has a printed circuit board 12 on which the various electric and electronic components necessary for the operation of the button 2 are mounted. In this case, the circuit 8 has electric connectors 14 for electrically connecting the printed circuit board 12 to a power source and to the processing unit. These electric connectors 14 are mounted on a lower face of the board 12. As illustrated in FIG. 2, the circuit 8 also has one or more detectors 16 for detecting the depressed position of the pusher 6, which one or more detectors 16 are mounted on an upper face of the board 12.

In this embodiment, the detector 16 is a magnetic field detector. It detects the depressed position when the amplitude of the magnetic field passing through it crosses a predetermined threshold or when the variation in the direction of the magnetic field crosses another predetermined threshold. When the depressed position is detected by the detector 16, in response, this information is transmitted to the external processing unit via, for example, a wired connection to the connector 14.

FIG. 2 shows the button 2 in a disassembled state in which the various elements of the button 2 are aligned one above another along the axis 10. From bottom to top, the button 2 comprises:

- the electronic circuit 8,
- a magnetic component 20 capable of generating the magnetic field detected by the detector 16,
- a mobile support 22 to which the magnetic component 20 is fastened,
- a magnetic bar 24,
- a spring 26,
- the pusher 6,
- the body 4,
- a seal 28, and
- a guide ring 30.

The magnetic component 20 directly affixes to the bar 24 by magnetic attraction. To this end, in this embodiment, the magnetic component 20 is a permanent magnet and the bar 24 is made from magnetic material, such as magnetic stainless steel.

The support 22 comprises:

- a lower part 32 situated below the bar 24 when the button 2 is in its assembled state,
- an upper part 34 situated above the bar 24 when the button 2 is in its assembled state, and
- two vertical slots 36 and 38 that are diametrically opposite with respect to the axis 10 and are intended to receive the bar 24.

The support 22 is a hollow solid of revolution, its axis of revolution coinciding with the axis 10. The cavity inside the solid 22 permits the passage of the bar 24 when the latter is received in the slots 36 and 38. In this embodiment, this cavity is a cylinder of revolution that emerges onto the upper face of the support 22.

The magnetic component 20 is fastened directly to the lower part 32 without any degree of freedom and without preventing the bar 24 from affixing directly to the component 20 when this bar 24 passes through the slots 36 and 38. For example, for this, the lower part 32 has a hole inside which the magnetic component 20 is fastened. This hole emerges, on one side, in the cavity of the support 22 and, on the opposite side, on the lower face of the support 22. When the magnetic component 20 is fastened in this hole, it has:

- an upper face intended to be affixed to and, alternately, detached from the bar 24, and
- a lower face, facing toward the electronic circuit 8, protruding beyond the lower face of the support 22.

The upper part 34 in this case has the form of a ring centered on the axis 10 and of rectangular cross section. Its upper face serves as a bearing surface for the spring 26.

The slots 36 and 38 are situated facing one another on each side of the axis 10. Here, the slots 36 and 38 are rectilinear slots of rectangular cross section that extend mainly vertically. The width of the slots 36 and 38 makes it possible to introduce the bar 24 inside the support 22. When the bar 24 is introduced inside the support 22, it has a central portion 40 situated inside the cavity of the support 22.

The height of the slots 36 and 38, in the direction Z, allows the support 22 to slide along the axis 10 between a top position, shown in FIG. 3, and a low position shown in FIG. 4, even when the bar 24 is immobile and introduced through the support 22.

In its top position, the upper part 34 is moved away from the bar 24 and the magnetic component 20 is affixed to the central portion 40 of the bar 24. In the bottom position, the upper part 34 directly bears against the bar 24 and the magnetic component 20 is moved away and detached from the bar 24.

For example, the height of the slots 36 and 38 is greater than 1 mm or 2 mm. This height is also generally less than 20 mm or 10 mm.

The bar 24 is made of a magnetic material attracted by the magnetic component 20. For example, the bar 24 is made from ferromagnetic material. In this embodiment, the bar 24 is not permanently magnetized.

The pusher 6 mainly has the shape of a cylinder of revolution of circular cross section. At its upper end, it has an outer pressing face 50, which a user presses down on to move the pusher 6 from its rest position to its depressed position. In this case, this face 50 extends mainly horizontally.

The pusher 6 has an interior cavity 52 configured to entirely receive the spring 26 and the support 22.

Figure 7:
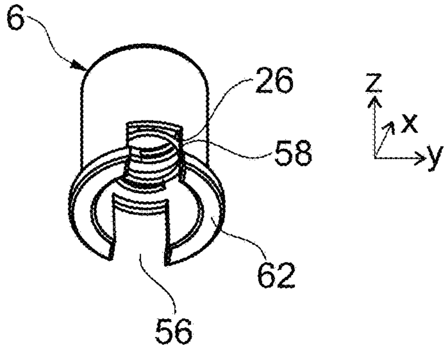

The pusher 6 also has two vertical slots 56 and 58 situated facing one another with respect to the axis 10. These slots 56 and 58 are rectilinear slots. In this case, the slots 56 and 58 each emerge in the lower end of the pusher 6. These slots 56 and 58 therefore have cross sections in the form of an upside-down "U" and extend mainly vertically (FIG. 7). These slots 56 and 58 allow the bar 24 to pass horizontally all the way through the pusher 6 while at the same time allowing the movement of this pusher 6 between its rest position and depressed position. When the bar 24 passes through the pusher 6, it has two ends 42 and 44 that project respectively to the right and to the left from the pusher 6.

The height of the slots 56 and 58, in the direction Z, is sufficient to allow the pusher 6 to move between its rest position and its depressed position. For example, the height of the slots 56 and 58 is greater than 3 mm or 5 mm. In general, the height of the slots 56 and 58 is also less than 30 mm or 20 mm.

The width of the slots 56 and 58 is dimensioned, as for the width of the slots 36 and 38, to make it possible to introduce the bar 24 into these slots.

The pusher 6 has an upper internal face 54 situated on the opposite side to the pressing face 50 and vertical internal faces 60. The vertical internal faces 60 are shaped to guide the support 22 in translation along the axis 10 by cooperation of shapes with the vertical external faces of the support 22.

At its lower end, the pusher 6 has a lower stop 62 that makes it possible to retain it inside the body 4. This lower stop 62 extends radially and horizontally and forms a protrusion on the outer periphery of the lower end of the pusher 6. In this embodiment, the lower stop 62 forms a rim that extends continuously around the entire outer periphery of the lower end of the pusher 6 except at the locations where the slots 56 and 58 emerge in this lower end (FIG. 7).

When the button 2 is in its assembled state, the spring 26 is entirely received inside the cavity 52 of the pusher. It bears, on one side, against the internal face 54 of the pusher 6 and, on the opposite side, against the upper part 34 of the support 22.

The pusher 6 also has, between the internal face 54 and above the slots 56 and 58, a shoulder 64 capable of directly bearing against the upper part 34 of the support 22 before the pusher has reached its depressed position. This shoulder 64 makes it possible to trigger the detachment of the magnetic component 20.

In this case, the spring 26 is dimensioned such that it is always in a compressively stressed state when the button 2 is used. For example, to this end, the spring 26 is dimensioned so as to be in a compressively stressed state when the pusher 6 is in its rest position and, at the same time, the support 22 is in its bottom position.

The stiffness of the spring 26 is also selected to be low enough that, when no external pressure is being applied to the pressing face 50, it allows the support 22 to rise from its bottom position to its top position only under the action of the magnetic attraction force between the component 20 and the bar 24. To this end, when the pusher 6 is in its rest position, the force exerted by the spring 26 on the support 22 is still less than the magnetic attraction force, at the same instant, between the magnetic component 20 and the bar 24. By virtue of this, when no external pressure is being applied, the support 22 returns to its top position using only the magnetic attraction force between the magnetic component 20 and the bar 24.

The stiffness of the spring 26 is also low enough that the force it exerts on the support 22 is less than the force required to detach the magnetic component 20, at least as long as the shoulder 64 is not directly bearing against the upper part 34 of the support 22. Conversely, its stiffness is sufficient to accelerate the movement of the support 22 toward its bottom position after the detachment of the magnetic component 20.

The body 4 has a vertical wall 70 that completely surrounds the axis 10 and that thus delimits, inside the body 4, a through-housing in which the circuit 8, the support 22, the pusher 6, the seal 28 and the ring 30 are accommodated in the assembled state. This housing emerges at the top and at the bottom, thus forming a lower circular opening 72 and an upper circular opening 74 at the lower end and upper end, respectively, of the body 4. The lower opening 72 is shaped to make it possible to introduce the pusher 6 into the body 4 through this opening 72. The upper opening 74 is shaped to make it possible to introduce the seal 28 and the ring 30 into the body 4.

The lower end of the wall 70 has a mechanism 75 (FIGS. 10 and 11) for fastening the circuit 8 inside the body 4. This mechanism 75 retains the circuit 8 inside the body 4 only by cooperation of shapes between the lower end of the body 4 and a perimeter of the circuit 8. For example, to this end the mechanism 75 has elastically deformable tabs that make it possible to clip the circuit 8 on the lower end of the body 4.

The upper end of the wall 70 has a seat for receiving the ring 30.

Between its lower and upper ends, the body 4 has a collar 76 protruding into the housing of the body 4. This collar 76 performs several functions. First of all, it is shaped to guide the pusher 6 in translation when it moves between its rest position and its depressed position. To this end, its inner periphery forms a circular vertical band that guides the pusher 6 in translation by cooperation of shapes with the outer periphery of the pusher 6. This collar 76 also cooperates with the lower stop 62 to retain the pusher 6 inside the body 4. More specifically, the collar 76 prevents the pusher 6 from being removed from the body 4 by being pulled upward. To this end, the collar 76 has a circular lower horizontal face 78 against which the lower stop 62 bears when the pusher 6 is in its rest position.

On the opposite side to the lower face 78, the collar 76 has an upper face 80 on which the bar 24 rests in the assembled state of the button 2. Here, the upper face 80 is also a circular face that extends mainly horizontally. This upper face 80 has two recesses 82 and 84 that are diametrically opposite with respect to the axis 10. In this case, the recesses 82 and 84 are situated along an axis that is parallel to the direction X and intersects the axis 10. In the assembled state, the recesses 82 and 84 receive the ends 42 and 44, respectively, of the bar 24. The ends 42 and 44 are permanently held in these recesses 82 and 84:

- by the spring 26 and the magnetic attraction force between the component 20 and the bar 24 in the rest position,
- by the spring 26 and the upper part 34 of the support 22 in the depressed position, and
- between the rest position and the depressed position, by the magnetic attraction force between the component 20 and the bar 24.

The recesses 82 and 84 and the ends 42 and 44 are shaped to lock the angular position of the pusher 6 when the ends 42, 44 are received inside the recesses 82, 84. For example, to this end, the recesses 82 and 84 and the ends 42 and 44 each have facing vertical faces that prevent the rotation of the pusher 6 by cooperation of shapes. Thus, if a user tries to turn the pusher 6 about the axis 10, he is prevented from doing so by the fact that the vertical sidewalls of the slots 56 and 58 then bear against the bar 24 that is itself prevented from rotating by the fact that the ends 42 and 44 are held in the recesses 82 and 84.

Lastly, the collar 76 has two notches 86 and 88 (FIG. 12) that are diametrically opposite with respect to the axis 10. In this case, these notches 86 and 88 are situated along an axis that is parallel to the direction Y and intersects the axis 10. Thus, in this embodiment, the notches 86 and 88 are angularly offset by 90° with respect to the recesses 82 and 84.

The notches 86 and 88 are wide enough to allow the bar 24 to pass through the collar 76. By contrast, they are also narrow enough to prevent the lower stop 62 from passing through the collar 76.

In this case, as explained later on, the combination of the bar 24, the lower stop 62, the collar 76 and the spring 26 forms a bayonet coupling for mounting and fastening the pusher 6 inside the body 4 in a simple way. More specifically, in this embodiment, it is the bar 24 that acts as the bayonet of this bayonet coupling.

The seal 28 is a seal that ensures, for example, the leaktightness of the button 2 with respect to splashes of water. In the assembled state, this seal 28 is clamped between the wall 70 and the outer periphery of the pusher 6. Here, in the assembled state, it is situated between the bar 24 and the ring 30.

The ring 30 also makes it possible to guide the pusher 6 in translation along the axis 10. To this end, it has a circular orifice that is centered on the axis 10 and inside which the outer periphery of the pusher 6 slides.

The button 2 functions as follows. When no external pressure is being applied, the pusher 6 is in its rest position and the support 22 is in its top position as shown in FIG. 3. In this state, the magnetic component 20 is affixed to the bar 24, and this holds the support 22 in its top position counter to the force exerted by the spring 26. In this state, the spring 26 is compressed between the upper part 34 of the support 22 and the internal face 54 of the pusher 6, thereby holding this pusher 6 in its rest position.

Then, the user starts to press the pusher 6 downward by pressing a finger against the face 50. The pusher 6 is then depressed in two successive phases:

an initial phase in which the magnetic component 20 remains affixed to the bar 24, and a final phase in which the magnetic component 20 is detached.

The initial phase lasts until the shoulder 64 bears directly against the support 22. More specifically, during the initial phase, the pusher 6 starts to descend while compressing the spring 26. The shoulder 64 then starts to bear against the upper part 34 of the support 22. At this juncture, the support 22 is still in its top position. When the shoulder 64 directly bears against the support 22, it makes it possible to directly transfer the pressing force exerted by the user, from the pusher 6 to the support 22 and therefore exert a pushing force directly on the magnetic component 20. The user must then exert an additional force to detach the magnetic component 20 from the bar 24. When the magnetic component 20 becomes detached, the initial phase ends and the final phase begins.

During the final phase, the potential energy stored in the spring 26 during the initial phase is suddenly released and used to rapidly move the magnetic component 20 away from the bar 24. As a result, the support 22 rapidly reaches its bottom position. The spring 26 is also relaxed such that the resistance that it presented, during the initial phase, to the depression of the pusher 6 has also suddenly decreased. Thus, when the initial phase changes to the final phase, the user feels the overcoming of a sticking point that confirms to them that the pusher 6 has been correctly and sufficiently depressed.

Then, the user continues to depress the pusher 6 by pressing on the face 50 so as to reach the depressed position shown in FIG. 4.

When the pusher 6 is released, external pressure is no longer being applied. The spring 26 then relaxes and brings the pusher 6 to its rest position.

The relaxation of the spring 26 causes the force it exerts on the support 22 to decrease. This force then becomes less than the magnetic attraction force between the component 20 and the bar 24. From that moment on, this magnetic attraction force automatically brings the support 22 into its top position.

Thus, the combination of the bar 24, the magnetic component 20, the support 22, the spring 26 and the shoulder 64 forms a snap-action mechanism, which is to say a mechanism in the case of which the pressure needing to be exerted on the face 50 to depress the pusher 6 drops suddenly when this pusher 6 is situated at a predetermined depth inside the body 4 and before it reaches the depressed position. The snap-action mechanism makes it possible to ensure that there is no intermediate position in the movement of the magnetic component 20. This makes it possible to obtain clear detection without an unstable position of the depressed position.

Figure 5:
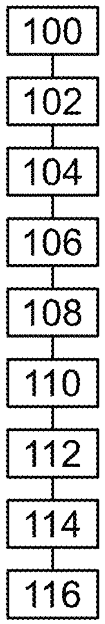
FIG. 5 is a flow chart of a method for assembling the push button in FIG. 1.

The assembly of the button 2 is now described with reference to the assembly method in FIG. 5 and using FIGS. 6 to 14.

Figure 6:
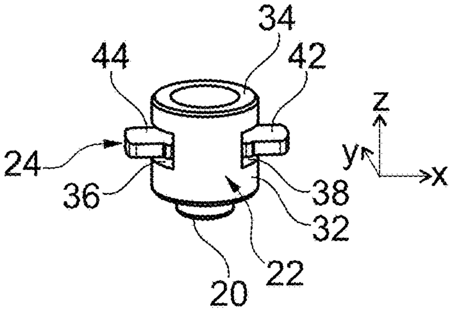
FIGS. 6 to 14 are illustrations, in perspective, of various states of assembly of the push button that are obtained by carrying out the method in FIG. 5.

During a step 100, the bar 24 is introduced through the slots 36 and 38 of the support 22 (FIG. 6).

During a step 102, the spring 26 is introduced into the cavity 52 of the pusher 6 (FIG. 7).

Figure 8:
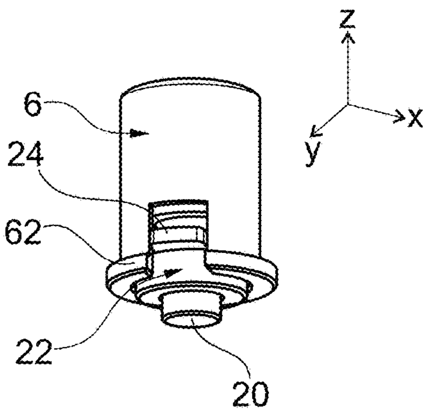

During a step 104, the combination of the support 22 and the bar 24 obtained at the end of step 100 is introduced into the cavity 52 of the pusher 6 (FIG. 8). The spring 26 is then trapped between the face 54 and the upper part 34 of the support 22.

Figure 9:
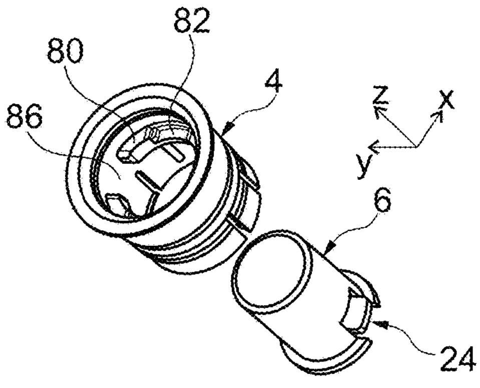

During a step 106, the assembly obtained at the end of step 104 is introduced into the body 4 from its lower end (FIG. 9).

Figure 10:
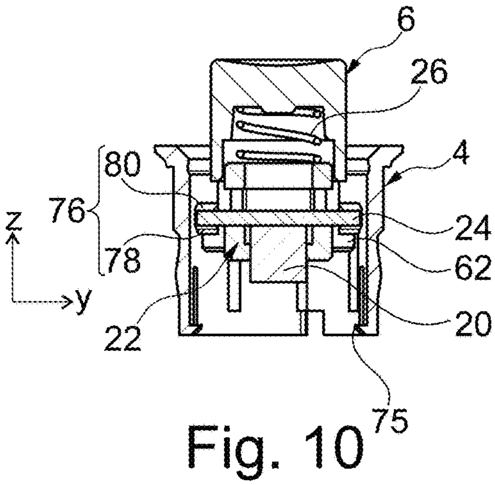

During a step 108, the assembly introduced into the body 4 is oriented angularly such that the ends 42 and 44 of the bar 24 face the notches 86 and 88, respectively. The bar 24, which functions as a bayonet of the bayonet coupling, is then in a free position. The free position is the position of the bayonet in which the pusher 6 can be freely dismounted and removed from the body 4. Thus, as shown in FIG. 10, the bar 24 starts to pass through the notches 86 and 88 and the lower stop 62 comes to bear against the lower face 78 of the collar 76. At this juncture, the spring 26 is not necessarily compressed.

Figure 11:
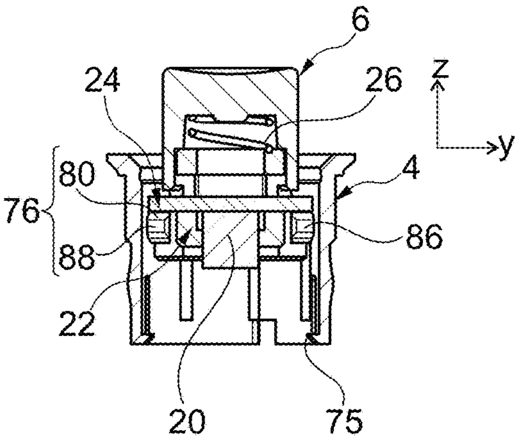

During a step 110, the support 22 is then pushed upward until the bar 24 is entirely above the upper face 80 of the collar 76 as shown in FIG. 11.

Figure 12:
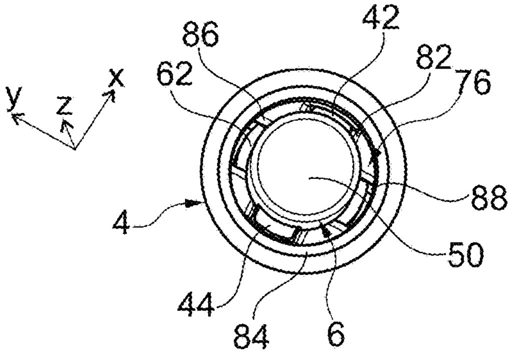
Figure 13:
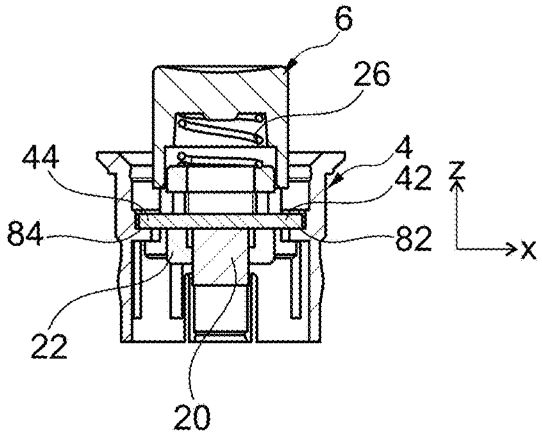

During a step 112, at this juncture, the pusher 6 is turned on itself by 90° while still keeping the support 22 pushed upward so as to hold the bar 24 above the upper face 80. In these conditions, the rotation of the pusher 6 by 90° causes the support 22 and the bar 24 to turn by 90° about the axis 10. At the end of this rotation, the ends 42 and 44 of the bar 24 are in front of the recesses 82 and 84. At this juncture, the support 22 is released (FIG. 12). The spring 26 and the magnetic attraction force between the component 20 and the bar 24 then push and subsequently hold the ends 42 and 44 inside the recesses 82 and 84. The state shown in FIGS. 12 and 13 is then reached. At the end of step 112, the bar 24, which acts as a bayonet, is then in a locked position.

The locked position is the position of the bayonet in which it bears against the collar 76 to retain the pusher 6 in a position mounted inside the body 4.

Figure 14:
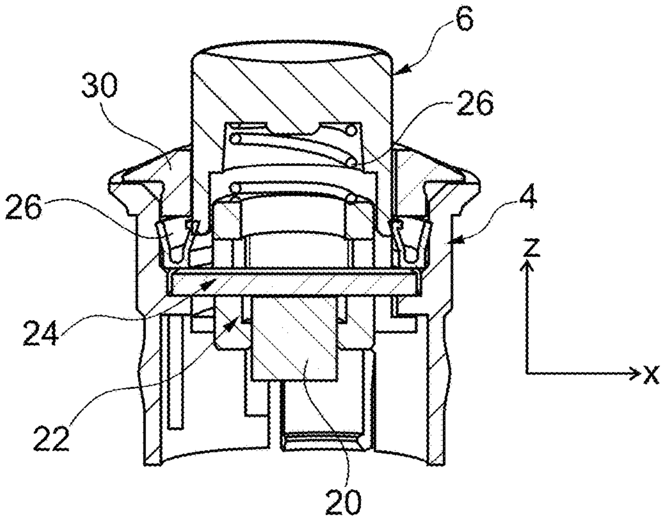

During a step 114, the seal 28 and then the ring 30 are introduced around the pusher 6 from the upper end of the body 4 (FIG. 14).

During a step 116, the circuit 8 is clipped on the lower end of the body 4 using the mechanism 75. The button is then in its assembled state as shown in FIGS. 1, 3 and 4.

Figure 15:
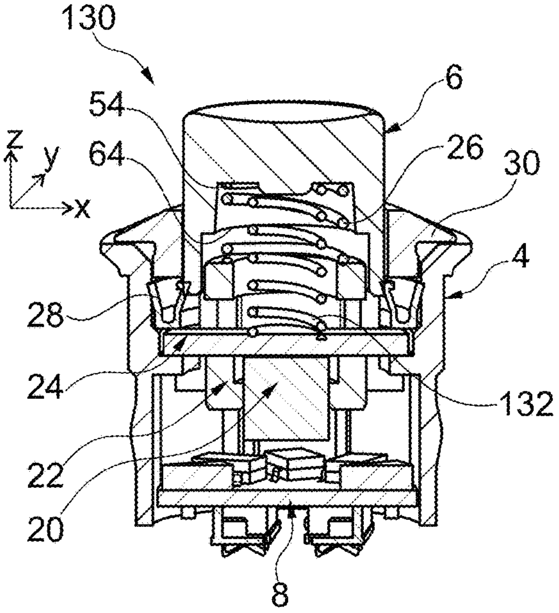
FIGS. 15 and 16 are schematic illustrations, in vertical section, respectively, of a first and a second variant of the push button in FIG. 1.

FIG. 15 shows a button 130 that is identical to the button 2 except that it has an additional spring 132 entirely accommodated inside the pusher 6 to increase the return force that returns the pusher 6 to its rest position. The spring 132 bears, on one side, against the internal face 54 of the pusher 6 and, on the opposite side, directly against an upper face of the bar 24. For example, in this case, the spring 132 is accommodated inside the spring 26 and in the cavity of the support 22 situated above the bar 24.

The button 130 functions like the button 2. In particular, as long as the shoulder 64 does not bear directly against the support 22, the magnetic component 20 remains affixed to the bar 24.

In this case, the spring 132 does not bear against the support 22. Thus, the support 22 is returned from its bottom position to its top position in exactly the way described above in the case of the button 2. By contrast, the spring 132 increases the return force that returns the pusher 6 to its rest position.

In this case in which the spring 132, independently of the spring 26, is used to bring the pusher 6 to its rest position, the spring 26 does not need to be systematically in a compressively stressed state when the support 22 is in its bottom position. In other words, the spring 26 by itself is not necessarily capable of bringing the pusher 6 from its depressed position to its rest position.

Figure 16:
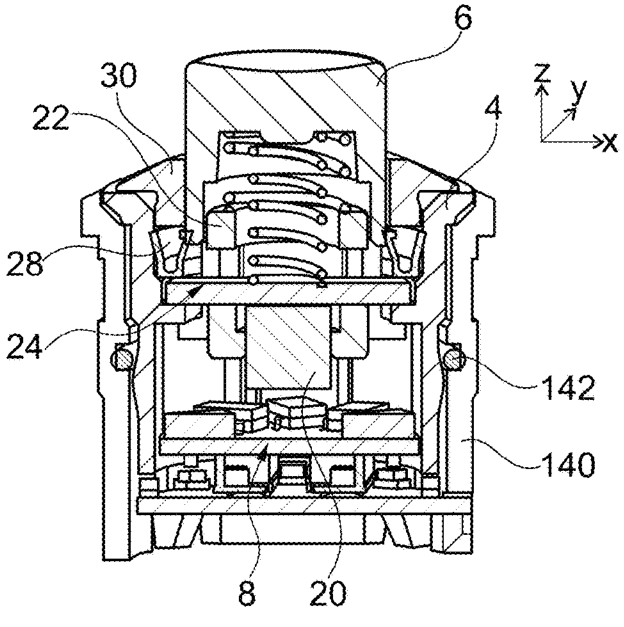

FIG. 16 shows the button 130 combined with the quick reversible locking mechanism described in the applications FR3007156 and FR3078174. This quick locking mechanism makes it easier to replace the button 130. To this end, the body 4 is shaped to be locked inside a barrel 140 using a seal 142 as taught in these patent applications. The barrel 140 and the seal 142 are described in detail in these patent applications and will not be described again here.

Chapter II: Variants

Variants of the Bayonet Coupling:

In a variant, it is the lower stop 62 of the pusher and the bayonet of the bayonet coupling that form only a single, same component. In this case, the lower stop 62 is shaped to be able to pass through the notches 86, 88. For example, for this, the lower stop 62 is limited to two diametrically opposite protrusions that each extend in the radial direction. In this variant, the bar 24 is arranged such that its ends 42, 44 do not pass through the notches 86, 88 during the assembly.

For example, in a first embodiment of this variant, the ends 42, 44 of the bar 24 are wider than the notches 86, 88 and therefore cannot pass through the notches 86, 88. To mount the pusher 6, it is introduced from the upper end of the body 4 until the lower stop 62 passes through the notches 86, 88 and is situated below the lower face 78 of the collar 76. At this juncture, the pusher 6 is turned about the axis 10 to move the lower stop 62 from the free position to the locked position. With preference, as described above, in the locked position, the ends 42, 44 of the bar 24 are received in the recesses 82, 84.

In a second embodiment of the variant above, to avoid the ends 42, 44 of the bar 24 passing through the notches 86, 88 when the lower stop 62 passes through them, an angular offset is introduced between the bar 24 and the lower stop 62. Thus, when the lower stop 62 passes through the notches 86, 88, the bar 24 remains blocked on the upper face 80 of the collar 76.

In a variant, the collar 76 has more than two notches 86, 88. In this case, the component that acts as a bayonet is shaped to have as many ends as there are notches. These ends are then disposed relative to one another such that they pass through the notches simultaneously when the bayonet is in its free position.

Variants of the Means for Preventing Rotation of the Pusher:

Recesses for preventing the rotation of the pusher 6 may also be formed on the lower face of the collar. In this case, the lower stop 62 is moreover shaped to be received inside these recesses when the pusher 6 is in the rest position.

In a simplified embodiment, the recesses 82, 84 are omitted. Thus, the rotation of the pusher 6 about the axis 10 is not prevented by cooperation of shapes between the ends 42, 44 of the bar 24 and these recesses 82, 84.

The means for preventing rotation of the pusher 6 may be obtained in a different way. For this, by way of illustration, sections of the periphery of the pusher 6 and of the guide ring 30 are shaped to prevent the rotation of the pusher 6 once the ring 30 is fastened to the body 4 of the button. For example, these sections of the periphery of the pusher 6 and of the ring 30 each have a flattened portion that, by mutual cooperation of shapes, prevents the rotation of the pusher 6 about the axis 10.

Variants of the Snap-Action Mechanism:

In a variant, the bar 24 is permanently magnetized. In this case, the magnetic component 20 is not necessarily itself also permanently magnetized. For example, the magnetic component 20 is then made from ferromagnetic material that is not magnetized permanently.

In a variant, the magnetic component 20 comprises a permanent magnet and another magnetic component that is not magnetized permanently. This other magnetic component is fastened to the permanent magnet without any degree of freedom and makes it possible to guide the field lines generated by the permanent magnet. For example, the permanent magnet occupies the position of the component 20 shown in FIGS. 3 and 4 and the other magnetic component is a ring made of magnetic stainless steel fastened without any degree of freedom about the upper part of the permanent magnet. The height of this ring is set such that it is only this ring that comes into direct mechanical contact with the bar 24 when the magnetic component 20 is affixed to the bar 24. In this embodiment, when the component 20 is affixed to the bar 24, a gap remains between the bar 24 and the permanent magnet of the component 20. This makes it possible to avoid the permanent magnet directly colliding with the bar 24 when the pusher 6 returns to its rest position. This makes the push button more robust notably as regards deterioration of the permanent magnet caused by impacts against the bar 24.

Other forms of the support 22 are possible. For example, the support may have a “U” shape, one of the arms of the “U” being situated underneath the bar 24 and the other arm of the “U” being situated above the bar 24. In this case, the support 22 comprises slots that emerge in the vertical plane containing the distal ends of the arms of the “U.”

In another embodiment, the bar 24 has a hole in its central portion 40 and the support 22 has a rod mounted slidingly inside this hole. This rod mechanically connects the lower part 32 to the upper part 34 of the support 22.

Other solutions for bringing the support 22 into its top position once the face 50 is no longer being pressed down on are possible. For example, the pusher 6 has a pin that comes to bear, for example, underneath the lower part 32 of the support 22 when the latter is in its bottom position. This pin then drives the support 22 toward its top position when the pusher 6 rises toward its rest position under the action of the spring 132. In another variant, an additional spring is introduced specifically to bring the support 22 from its bottom position to its top position. In these variants, the magnetic attraction force between the bar 24 and the magnetic component 20 does not need to be greater than the return force exerted by the spring 26 when the support 22 is in its bottom position.

In a variant, the spring 132 is configured to be capable of performing the following two functions by itself: returning the pusher 6 to its rest position and holding the bar 24 pressed against the upper face 80 of the collar 76. In this case, the spring 26 does not need to contribute to performing these two functions. Thus, when the pusher 6 of the button 130 is in its rest position, the spring 26 may be in a non-compressively stressed state. This slightly slows down the return of the pusher 6 to its rest position.

Other Variants:

Other embodiments of the depressed-position detector 16 are possible. For example, in a variant, the detector 16 is replaced by a resistive or other optical detector. For example, the detector 16 is replaced by a switch that is mechanically moved from an open position to a closed position by the lower part 32 of the support 22 or by the lower stop 62.

The lower stop 62 does not necessarily form a continuous rim around the axis 10. For example, in a variant, the stop 62 is formed of multiple protrusions that are distributed around the periphery of the pusher 6 and that each extend in a respective horizontal radial direction.

The pressing face 50 of the pusher 6 may have other shapes. For example, in a particular embodiment, the pressing face is a hemisphere.

The button 2 may be used in any man-machine interface such as, for example, in any aircraft man-machine interface or any man-machine interface of an apparatus other than an aircraft. In a variant, the pusher 6 is moved toward its depressed position not by a user's finger but by another part of the user's body, such as their foot. The pusher may also be moved toward its depressed position by an object. For example, the pusher is moved toward its depressed position by a door. Thus, in a variant, this button may also be used as a detector of a mechanical position in an automatic system.

Variants Specific to the Presence of the Bayonet Coupling:

In a simplified embodiment, the shoulder 64 is omitted. In this case, the component 20 is detached when the force exerted on the support 22 by the spring 26 exceeds the magnetic attraction that holds the component 20 affixed to the bar 24.

In a simplified embodiment, the snap-action mechanism is omitted. For example, the spring 26 of the button 130 is omitted. In this variant, the button comprises only the spring 132 and during the final phase the support 22 is moved toward its bottom position by the shoulder 64. There is therefore no snap action. By contrast, when the initial phase changes to the final phase, the user still feels the overcoming of a sticking point. This variant is notably advantageous if the button is a proportional button that sends a signal that varies proportionally to how far the pusher 6 is depressed.

If the snap-action mechanism is omitted, the support 22 and the spring 26 of the button 130 may also be omitted and only the spring 132 is kept. For example, the magnetic component 20 is then fastened, directly and without any degree of freedom, to the lower end of the pusher 6. For example, the magnetic component 20 is directly fastened to the lower stop 62. In this variant, the bar 24 may be made from non-magnetic material. If the detector 16 does not utilize the magnetic field emitted by the magnetic component 20 to detect the depressed position, the magnetic component 20 can also be omitted.

Chapter III: Advantages of the Embodiments Described

Using a bayonet coupling simplifies the mounting of the pusher 6 in the fixed body 4. For example, the pusher 6 may be mounted and dismounted without needing to use a tool. The use of the bar 24 mounted slidingly inside the slots 56 and 58 of the pusher 6 makes it possible to accommodate the spring 26 of the bayonet coupling entirely inside the pusher and therefore protect it from external attacks without needing to provide additional components around the pusher 6. In addition, this same spring 26 returns the pusher 6 to its rest position and holds the bayonet in its locked position. Using the same spring 26 to perform these two functions also simplifies the architecture of the button.

The fact that the bar 24 is also used as a bayonet of the bayonet coupling makes it possible to limit the number of components of the push button and therefore makes it easier to manufacture. In addition, this prevents any dismounting of the pusher from the upper side of the body. Specifically, in this case, the pusher can be mounted and dismounted only from the lower side of the body 4, which is to say from a side inaccessible to the user during normal use of the button.

The recesses 82, 84 of the collar 76 make it possible to permanently prevent the rotation of the pusher 6 about the axis 10. In this case, the bar 24 contributes to performing at least three different functions, namely:

- a function of returning the pusher 6 to its rest position, notably by cooperating with the spring 26,
- a function of locking the pusher 6 in its raised position, and
- a function of preventing the rotation of the pusher 6 by cooperating with the recesses 82, 84.

The fact that the same bar 24 contributes to performing several functions simplifies the architecture of the button.

Producing the bar from magnetic material moreover makes it possible to use this bar to realize the snap-action mechanism. Thus, in this embodiment, the bar contributes to performing the following three functions:

- the function of returning the pusher 6 to its rest position, notably by cooperating with the spring 26,
- the function of locking the pusher 6 in its raised position, and
- the snap-action function of the snap-action mechanism.

Using the same spring 26 simultaneously for performing the function of a return spring for returning the pusher to its rest position, the spring function of the bayonet coupling and the spring function of the snap-action mechanism makes it possible to simplify the architecture of the button.

The fact that the magnetic attraction force between the bar 24 and the magnetic component 20 in the bottom position of the support is greater than the force exerted, in the opposite direction, by the spring 26 when no external pressure is being applied, makes it possible to bring the support 22 into its top position once the face 50 is no longer being pressed down on, without using an additional spring.

The shoulder 64 makes it possible to simply and precisely control the distance traveled by the pusher 6 before the magnetic component 20 becomes detached. In particular, this distance no longer depends solely on the stiffness of the spring 26, thereby relaxing the constraints on the selection of this stiffness and simplifying the production of the button. In addition, this distance no longer varies as a function of the fatigue of the spring 26.

The fact that the spring 26 is systematically in a compressively stressed state makes it possible to accelerate the return of the pusher 6 to its rest position once the face 50 is no longer being pressed down on.

The invention claimed is:

1. A push button comprising:

a hollow pusher capable of sliding, along a movement axis, between a rest position and a depressed position, this pusher comprising, on one side, a pressing face and, on the opposite side, a lower stop that extends in directions perpendicular to the movement axis, the rest position corresponding to the position occupied by the pusher when no external pressure is being applied to the pressing face of the pusher, a fixed body comprising a collar inside which the pusher slides when it moves between its rest position and its depressed position, this collar comprising a lower face against which the lower stop of the pusher bears in the rest position to retain the pusher inside the collar, a bayonet coupling for mounting the pusher inside the fixed body, this bayonet coupling to this end comprising:

a bayonet mechanically connected to the pusher so as to be angularly moved by rotation of the pusher about the movement axis between:

a locked position, in which the bayonet bears against the collar to retain the pusher in a position mounted inside the fixed body, and a free position, in which the pusher can be dismounted and removed from the fixed body, notches made in the collar to allow the bayonet to pass through this collar when the bayonet is in its free position, a spring that, in the locked position, is capable of keeping the bayonet bearing against the collar and bringing the pusher from its depressed position to its rest position, wherein:

the pusher has two facing slots that each extend mainly parallel to the movement axis, the bayonet coupling comprises a bar that passes through the two slots of the pusher and the ends of which, which project beyond the pusher, each bear against the upper face of the collar, this bar being capable of sliding inside these two slots when the pusher is moved between its rest position and its depressed position, the spring of the bayonet coupling is entirely accommodated inside the hollow pusher between an internal face of the pusher and a central portion of the bar situated between its two ends, and the bayonet of the bayonet coupling and one from among the bar and the lower stop form only a single, same component.

2. The button as claimed in claim 1, wherein the bayonet of the bayonet coupling and the bar form only a single, same component and the lower stop is arranged so as to prevent it from passing through the notches of the collar.

3. The button as claimed in claim 1, wherein the collar comprises:

an upper face situated on the opposite side to its lower face, and two recesses formed in this upper face so as to each receive a respective end of the bar when the bayonet is in its locked position.

4. The button as claimed in claim 1, wherein the button has a snap-action mechanism, this snap-action mechanism comprising:

the bar made from magnetic material, a magnetic component situated below the bar, which is to say on that side of the bar where the lower stop of the pusher is located, this magnetic component and the bar being capable of being magnetically affixed to one another, a support situated inside the hollow pusher and having:

a lower part situated below the bar and to which the magnetic component is fastened, without any degree of freedom, and an upper part situated above the bar, this support being capable of sliding inside the hollow pusher between:

a top position, in which the magnetic component and the bar are magnetically affixed to one another, and a bottom position, in which the magnetic component is moved away and detached from the bar, a spring interposed between the pusher and the upper part of the support so as to accelerate the movement of the magnetic component away from the bar after this magnetic component has been detached from the bar.

5. The button as claimed in claim 4, wherein:

the upper part of the support is configured to bear against the bar in the bottom position, and the spring of the bayonet coupling and the spring of the snap-action mechanism form only a single, same spring.

6. The button as claimed in claim 4, wherein the bar and the magnetic component are configured such that, in the bottom position of the support, the magnetic attraction force between the bar and the magnetic component is greater than the force exerted by the spring of the snap-action mechanism on the upper part of the support when no external pressure is being applied to the pressing face of the pusher.

7. The button as claimed in claim 4, wherein the snap-action mechanism comprises a shoulder formed in the pusher, this shoulder being capable of directly bearing against the upper part of the support after the movement of the pusher from its rest position to its depressed position has compressed the spring of the snap-action mechanism without causing the detachment of the magnetic component.

8. The button as claimed in claim 4, wherein the spring is configured to be systematically in a compressively stressed state when the support is in its bottom position.

* * * * *